US008279965B2

(12) United States Patent
Leung

(10) Patent No.: US 8,279,965 B2
(45) Date of Patent: Oct. 2, 2012

(54) MULTIPLE ANTENNA SPATIAL MULTIPLEXING OPTIMAL DETECTION

(75) Inventor: Chris Leung, Tai Po (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 745 days.

(21) Appl. No.: 12/495,305

(22) Filed: Jun. 30, 2009

(65) Prior Publication Data

US 2010/0329378 A1    Dec. 30, 2010

(51) Int. Cl.
*H04L 1/02* (2006.01)
(52) U.S. Cl. .................. 375/267; 375/340; 375/349
(58) Field of Classification Search .......... 375/140, 375/141, 147, 260, 267, 316, 340, 347, 349
See application file for complete search history.

(56) References Cited

U.S. PATENT DOCUMENTS 7,489,746 B1* 2/2009 Awater et al. ............. 375/341
7,751,506 B2* 7/2010 Niu et al. .................. 375/341
2006/0171483 A1* 8/2006 Jia et al. .................... 375/267
2007/0268813 A1 11/2007 Muquet et al.
2008/0056396 A1* 3/2008 Li ............................. 375/260

OTHER PUBLICATIONS

Tosato, Filippo, Bisaglia, Paola, "Simplified Soft-Output Demapper for Binary Interleaved COFDM with Application to HIPERLAN/2," 2002 IEEE, pp. 664-668.
Hassibi, Babak, Vikalo, Haris, "On the Sphere-Decoding Algorithm I. Expected Complexity," IEEE Transactions on Signal Processing, vol. 53, No. 8, Aug. 2005, pp. 2806-2818.

* cited by examiner

*Primary Examiner* — Dac Ha
(74) *Attorney, Agent, or Firm* — Fulbright & Jaworski L.L.P.

(57) ABSTRACT

MIMO detection is described that reduces the complexity of computations for finding the soft bit output. The detection process includes QR factorization splitting the distance calculations into two groups, subset lookup using a last cross constellation set (LCCS) lookup, and minimal distance lookup with soft bit output calculation. By grouping the distance calculations into a first group that has one antenna transmitting using a modulation scheme with a generally square constellation diagram and a second group for all of the other antenna constellation diagrams, the LCCS lookup process may be used which substantially reduces the number of calculations to be made in the detection process. Moreover, in the special case of 2×2 antenna, QR factorization is performed by applying a scaled Givens rotation to the channel matrix. The application of the scaled Givens rotation operator eliminates any square root operations that would be performed in a standard QR factorization.

20 Claims, 8 Drawing Sheets

MULTIPLE ANTENNA SPATIAL MULTIPLEXING OPTIMAL DETECTION

TECHNICAL FIELD

The present teachings relate, in general, to wireless communications, and, more particularly, to multiple antenna spatial multiplexing optimal detection (MASMOD) of soft bit output in multiple input, multiple output (MIMO) systems.

BACKGROUND

As the availability of wireless communications grows, the demand for increased bandwidth and functionality continues to grow along with it. With each passing generation of wireless system, the speed, bandwidth, and reliability of such system increases. One technique that has become popular for increasing the overall performance of wireless systems is the use of multiple antenna. Multiple input, multiple output (MIMO) systems provide for each transmitter and receiver to have multiple antenna. For instance, the receiver has two or more receiver antenna and the transmitter has two or more transmitting antenna. Such MIMO systems have application in several digital communication modulation schemes, such as orthogonal frequency-division multiple access (OFDMA), code division multiple access (CDMA), and the like. Moreover, these systems provide the basis of new generations of wireless local area networks, such as wireless fidelity (Wi-Fi) and broadband wireless access systems such as the worldwide interoperability for microwave access (WiMAX), and the long term evolution (LTE) defined by the 3$^{rd}$ Generation Partnership Project (3GPP).

One of the most popular and promising transmission schemes being used in MIMO systems is spatial multiplexing. Spatial multiplexing is a transmission technique that transmits independent and separately encoded data signals, referred to as "streams," from each of the multiple transmit antenna. Therefore, the transmission channel space is reused, or multiplexed, repeatedly. The maximum order of spatial multiplexing is limited to the minimum of transmitting or receiving antenna. Thus, while a connection between four transmitting antenna with three receiving antenna produces spatial multiplexing on the order of three, the inverse connection between three transmitting antenna with four receiving antenna also produces a spatial multiplexing order of three. This multiplexing order means that the signal streams may be transmitted in parallel the number of times equivalent to the multiplexing order, leading to a substantial increase of the spectral efficiency (i.e., the number of bits per second and per Herz (Hz) that can be transmitted over the wireless channel).

FIG. 1 is a block diagram illustrating typical MIMO wireless system 10 implemented using spatial multiplexing. Transmitter 100 includes processing block 101 which processes input, $I_n$, into bits, $b_1, b_2, \ldots b_n$, for transmission to receiver 102. Quadrature modulators, $mod_1, mod_2, \ldots mod_n$, modulate bits, $b_1, b_2, \ldots b_n$, into modulated symbols, $x_1, x_2, \ldots x_n$, for transmission via the transmission antenna array comprising antenna $a_{t1}, a_{t2}, \ldots a_{tn}$. Quadrature modulators, $mod_1, mod_2, \ldots mod_n$, perform symbol modulation that results in the in-phase/quadrature (I/Q) portions of each constellation point modulating two carrier signals with a 90 degree phase difference. Examples of quadrature modulation schemes include quadrature amplitude modulation (QAM), quadrature phase-shift keying (QPSK), quadrature amplitude-shift keying (QASK), and the like.

As modulated symbol x is transmitted through antenna $a_{t1}$, each of the antenna, $a_{r1}, a_{r2}, \ldots a_{rn}$, of the receiver antenna array receives the received signal, $y_1$, over the particular channel between the antenna. The particular channels are represented by channel matrices, $h_{11}, h_{12}, \ldots h_{1n}$, in which channel matrix $h_{ij}$, is the channel response between transmit antenna $a_{tj}$ and receiver antenna $a_{ri}$. The received signals, $y_1, y_2, \ldots y_n$, are represented by the mathematical relationship:

$$\begin{pmatrix} y_1 \\ y_2 \\ \ldots \\ y_n \end{pmatrix} = \begin{pmatrix} h_{11} & h_{12} & \ldots & h_{1n} \\ h_{21} & h_{22} & \ldots & h_{2n} \\ \ldots & \ldots & \ldots & \ldots \\ h_{n1} & h_{n2} & \ldots & h_{nm} \end{pmatrix} \begin{pmatrix} x_1 \\ x_2 \\ \ldots \\ x_n \end{pmatrix} + \begin{pmatrix} n_1 \\ n_2 \\ \ldots \\ n_n \end{pmatrix} \quad (1)$$

Where $n_1, n_2, \ldots n_n$ are the additive white Gaussian noise (AWGN) values added by the antenna $a_{r1}, a_{r2}, \ldots a_{rn}$, of the receiver antenna array.

At receiver 102, the first step in some types of receivers for recapturing the transmitted bits, $b_1, b_2, \ldots b_n$, from received signals, $y_1, y_2, \ldots y_n$, is to obtain the soft bit output through MIMO detection unit 103. MIMO detection produces the soft bit output, which is equivalent to the log likelihood ratio (LLR) of the bits. Thus, MIMO detection unit 103 produces soft bit outputs $LLR(b_1) LLR(b_2), \ldots LLR(b_n)$. Generating this soft bit output in LLR provides optimal detection results for the following decoding stages of receiver 102. Decoder 104 decodes and performs forward error correction (FEC) on the soft bit outputs to recapture bits $b_1, b_2, \ldots b_n$ after which cyclic redundancy checker (CRC) 105 performs error checking after which output, O, is generated at processing stage 106. However, it is the MIMO detection process, at MIMO detection unit 103, that typically adds a great deal of complexity to any MIMO system.

Several current methods are used to perform MIMO detection in spatial multiplexing MIMO systems. Receivers that decode or detect symbols in MIMO systems may be considered either optimal or sub-optimal. An optimal receiver guarantees detection of the two distance variables required for calculating the soft bit output, i.e., the LLR of the bits. The soft bit output of any given bit, $b_i$, is determined according to:

$$LLR(b_i) = \max_x(\log(Prob(y \mid x, b_i = 0))) - \max_x(\log(Prob(y \mid x, b_i = 1))) \quad (2)$$

Where x is a vector of a size equal to the number of transmit antenna, y is a vector of a size equal to the number of receiver antenna. As equation (2) illustrates, two terms, each finding a maximal value with respect to all possible combinations of x having a fixed value of $b_i$ are required to accurately calculate the soft bit output. One of the terms is calculated for $b_i$=0, the other for $b_i$=1. The two maximal terms are typically calculated using two minimal distance values between y and Hx, where y is the received signal, H is the channel matrix, and x is the transmitted signal, which is represented by a constellation point. Sub-optimal receivers, at most, guarantee to detect or determine only one of the two required distance variables. These sub-optimal techniques generally use estimates based on the determined first distance to calculate the second distance. A true optimal receiver typically examines every possible combination of symbols in each constellation set associated with the modulation schemes used in the transmission. By examining all such possible combinations, the exact two minimal distance variables can be guaranteed, and, using those two variables, the optimal soft bit output is derived.

However, as noted above, examination of such a large number of possible combinations, especially in higher ordered modulation rates, raises the computational complexity of the applicable receiver. An example of an optimal receiver is a receiver that performs MIMO detection using the maximal log likelihood ratio (MLLR) method. The MLLR examines all possible combinations of the received symbols. As expected, though, the cost for an optimal solution is high computational complexity.

Many of the existing detection techniques considered practical for real world application are sub-optimal because they simply cannot guarantee detection of both required distance variables, and, as such, cannot produce an optimal solution every time. The difference between many of these existing detection techniques is simply how sub-optimal the detection process is. If the level of reliability will produce enough accurate results on average to meet the quality of service standards for wireless communications, these sub-optimal receivers may be used in the various wireless networks. For example, a receiver using the list sphere decoder (LSD) method produces a sub-optimal result by examining a variable number of symbol combinations that will only guarantee one of the two required distance variables. The second required variable may be selected having only a probability of being the actual second distance variable or may be estimated using one or more estimation algorithms based on the determined first distance. In either method, the second distance variable cannot be guaranteed. The resulting reduction in combinations that are examined greatly simplifies the computational requirements but does so at the cost of detection quality. However, as noted, the LSD technique examines a variable number of symbol combinations. The actual number of combinations examined in the LSD method is influenced by the signal-to-noise ratio (SNR), such that the number of combinations examined increases as the SNR increases. In a worst case scenario, the LSD process may end up examining all possible combinations, just as in the MLLR process. The number of combinations examined are also influenced by how the particular QR factorization and tree parsing/pruning algorithms fit with the time-varying channel characteristics.

Another aspect of computational complexity found in the LSD detection methodology is its use of tree structures to represent constellation signals. LSD represents the constellation points in tree structures to take advantage of known tree search algorithms for calculating the distance measurement. However, the process used simply to parse these tree structures provides a great deal of additional complexity to the receiver.

Somewhere in the middle, between the optimal MLLR and sub-optimal LSD, is the sub-optimal MIMO detection process from Sequans Communications described in U.S. Patent Application Publication Number 2007/0268813 ('813 application), which is incorporated herein by reference. The process described in the '813 application is sub-optimal because it does not examine all possible combinations. It claims to produce an optimal result along the lines of MLLR without all of the computational complexity of MLLR. However, even the described process of the '813 application admittedly sacrifices some optimality in order to reduce computational complexity.

BRIEF SUMMARY

Various embodiments of the present teachings are directed to methods for detecting MIMO communications. The methods include selecting, responsive to receiving a MIMO signal at a receiver, one antenna from a plurality of antenna transmitting the received MIMO signal for a first group, wherein the selected antenna transmits using a modulation scheme represented by a first constellation diagram having a generally square shape. The methods also include designating a second group comprising one or more additional constellation diagrams representing the remaining antenna and estimating a set of distances between the received MIMO signal and a corresponding transmitted symbol. The estimating includes, for each constellation point in the second group, calculating a first partial distance between each constellation point in the second group and the received MIMO signal and calculating a second partial distance between each constellation point in the second group and each one of a select group of constellation points in the first group. This select group of constellation points comprises a minimal distance constellation point and m additional constellation points arranged in a cross surrounding the minimal distance point in the constellation diagram, wherein m is a modulation order of the modulation scheme. The methods also include computing the set of distances based on a sum of corresponding ones of each of the first and second partial distances and looking up two minimal distances based on the set of distances.

Additional representative embodiments are directed to wireless receivers that include a main processor, memory coupled to the main processor, receiver circuitry coupled to the main processor, an antenna array having a plurality of antenna, the antenna array coupled to the receiver circuitry, and a MIMO detector within the receiver circuitry. The MIMO detector is configured to form a first group comprising a first constellation diagram having a generally square shape. The first constellation group represents a modulation scheme of one of the plurality of antenna. The MIMO detector is also configured to form a second group comprising one or more additional constellation diagrams representing the modulation scheme of the remainder of the antenna. For each constellation point in the second group, the MIMO detector is further configured to calculate a first partial Euclidean distance ($PED_2$) based on each constellation point in the second group, select a minimum distance point in the first group, retrieve m additional points from a look up table stored in the memory, wherein m is the modulation order of the antenna in the first group, compute a second partial Euclidean distance ($PED_1$) between each constellation point in the second group and each of: the minimum distance point and the m additional points, and sum the $PED_2$ and the $PED_1$ into a distance. The m additional points are indexed according to the minimum distance point and form a cross surrounding the minimum distance point. The MIMO detector is then configured to determine soft bit output based on the distance.

Still further representative embodiments of the present teachings are directed to methods for detecting MIMO signals in a 2×2 spatially multiplexed MIMO wireless network. The methods include receiving a MIMO signal at a receiver, inserting zeros into a channel matrix by factorizing the channel matrix with a scaled Givens operator, dividing two transmitting antenna into two groups, wherein the first group includes a generally square constellation diagram representing a first transmitting antenna of the two antenna, and a second group includes another constellation diagram representing the other transmitting antenna. The methods further include mixing the factorized channel matrix with the received MIMO signal, estimating a set of distances between the factorized received MIMO signal and a plurality of constellation points of the first and second groups, and computing the set of distances based on a sum of corresponding ones of each of the first and second partial distances. The estimating includes, for each constellation point in the second group, calculating a first partial distance between each constellation point in the second group and the factorized received MIMO signal and calculating a second partial distance between each constellation point in the second group and each one of a select group of constellation points in the first group. This select group of constellation points comprises a minimal distance point and m additional constellation points, wherein m is a modulation order of a modulation scheme used by the first transmitting antenna.

The foregoing has outlined rather broadly the features and technical advantages of the present teachings in order that the detailed description that follows may be better understood. Additional features and advantages of the teachings herein will be described hereinafter which form the subject of the claims. It should be appreciated by those skilled in the art that the conception and specific embodiment disclosed may be readily utilized as a basis for modifying or designing other structures for carrying out the same purposes of the present teachings. It should also be realized by those skilled in the art that such equivalent constructions do not depart from the spirit and scope of the teachings as set forth in the appended claims. The novel features which are believed to be characteristic of the teachings herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following descriptions taken in conjunction with the accompanying drawing, in which.

DETAILED DESCRIPTION

Figure 1:
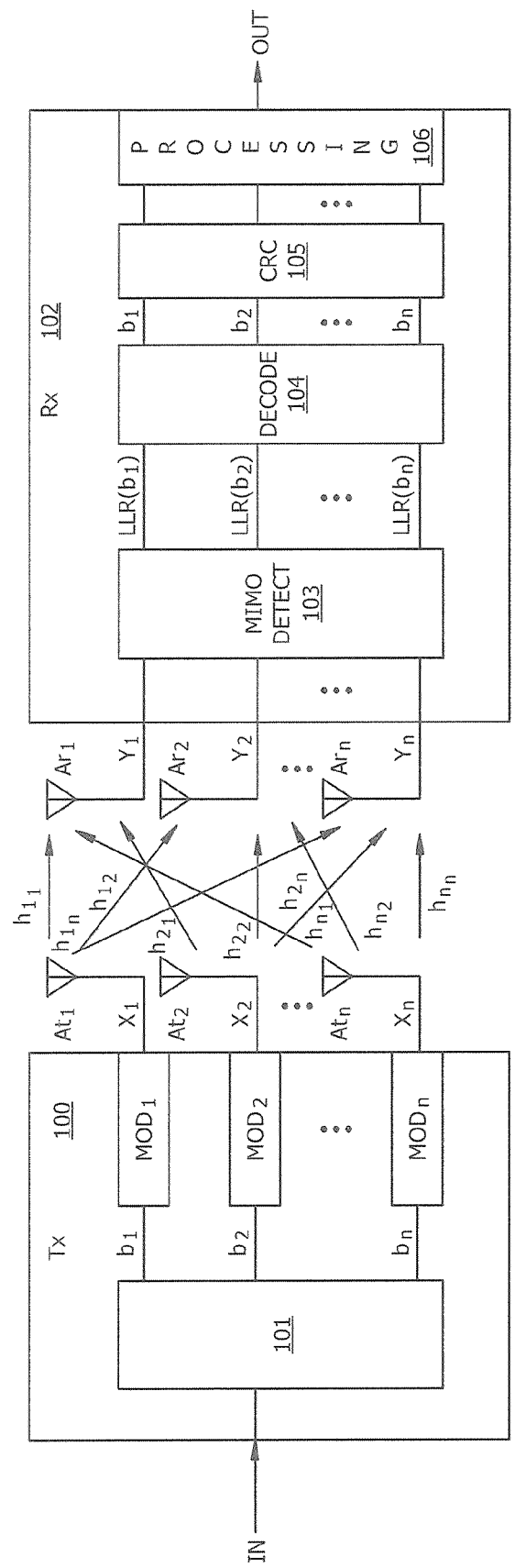
FIG. 1 is a block diagram illustrating a typical MIMO wireless system implemented using spatial multiplexing.
Figure 2:
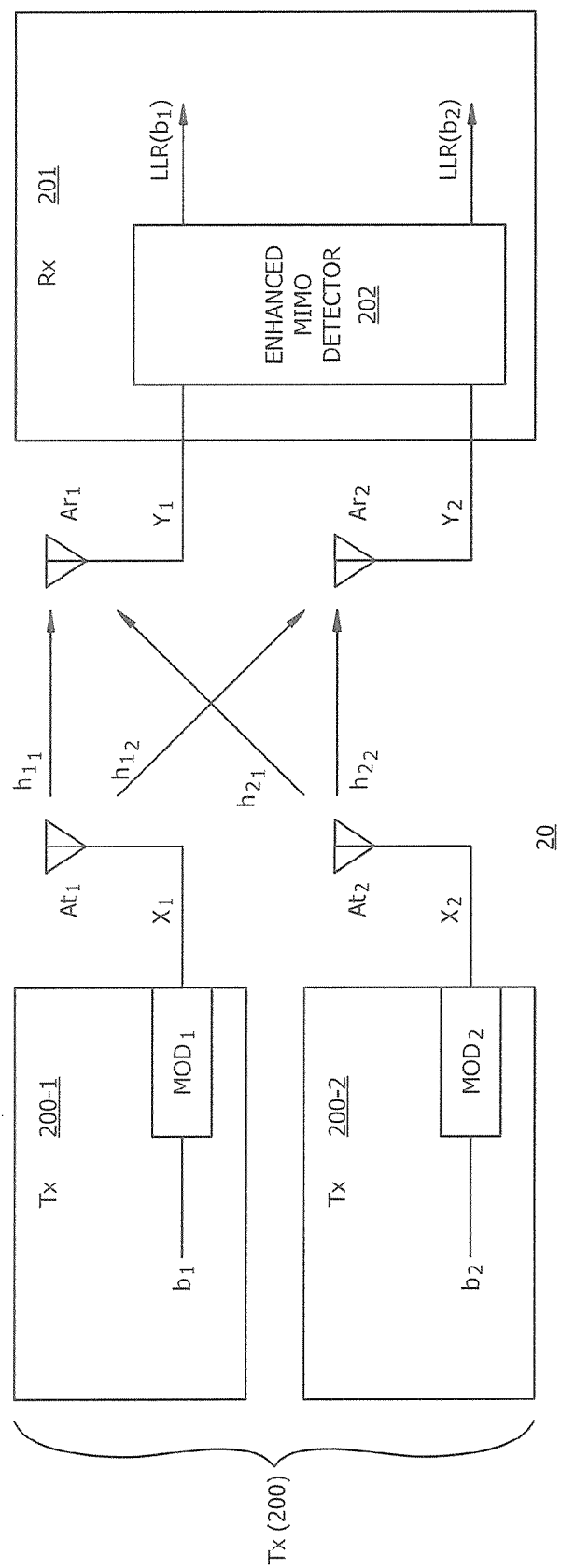
FIG. 2 is a block diagram illustrating a spatial multiplexing MIMO wireless system configured according to one embodiment of the present teachings.

FIG. 2 is a block diagram illustrating spatial multiplexing MIMO wireless system 20 configured according to one embodiment of the present teachings. Transmitter 200 and receiver 201 are each configured with an antenna array made up of two antenna each, $a_{t1}$ and $a_{t2}$, for transmitter 200, and $a_{r1}$ and $a_{r2}$, for receiver 201. The antenna array, as well as the transmission functionality of transmitter 200, is split between two separate devices, transmitter 200-1 and transmitter 200-2, with antenna $a_{t1}$ residing on transmitter 200-1 and antenna $a_{t2}$ residing on transmitter 200-2. This 2×2 antenna array configuration provides a special case MIMO set up in the operation of the described embodiment of the MASMOD, i.e., a dual antenna spatial multiplexing optimal detection (DASMOD) system. In operation, the 2×2 configuration of transmitter 200 and receiver 201 operate in a similar general manner to that of transmitter 100 and receiver 102 of FIG. 1, with the exception of the number of antenna present. Data bits, $b_1$ and $b_2$, are modulated at modulators, $mod_1$ and $mod_2$, producing modulated symbols, $x_1$ and $x_2$. At least one of $mod_1$ and $mod_2$ are configured to use a quadrature modulation scheme that has a constellation diagram that is generally square in appearance. Examples of such square constellation modulation schemes are QAM, some lower-ordered QPSK schemes, and the like. Modulated symbols $x_1$ and $x_2$ are then transmitted via antenna, $a_{t1}$ and $a_{t2}$, over the airwaves. Receiver 201 receives the transmitted symbols as received signals, $y_1$ and $y_2$. Enhanced MIMO detector 202 processes received signals $y_1$ and $y_2$ into soft bit outputs, $LLR(b_1)$ and $LLR(b_2)$ in order to ultimately decode the transmitted symbols. The MIMO detection process employed by enhanced MIMO detector 202 examines a fixed number of possible combinations and produces an optimal result on par with the results obtained by the MLLR process and without the computational complexities of examining all possible combinations or parsing large tree structures.

Figure 3:
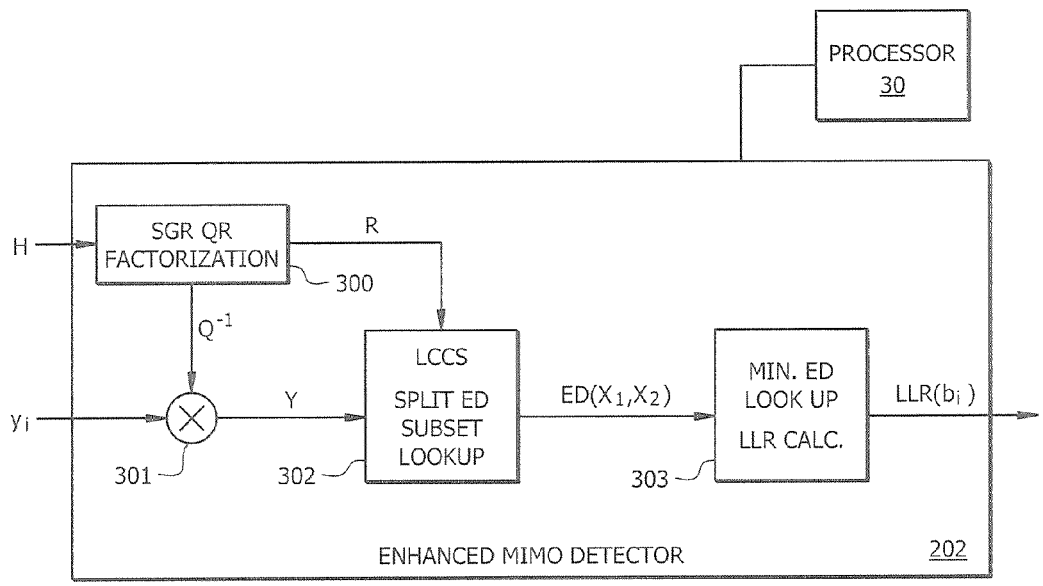
FIG. 3 is a block diagram illustrating a detailed view of an enhanced MIMO detector configured according to one embodiment of the present teachings.

FIG. 3 is a block diagram illustrating a detailed view of enhanced MIMO detector 202 configured according to one embodiment of the present teachings. Enhanced MIMO detector 202, which operates under control of processor 30 of receiver 201 (FIG. 2), begins processing received signal, $y_i$, by performing a QR factorization of the channel matrix, H. A channel matrix is an expression that models the channel over which the modulated symbol is transmitted. It represents the channel gain between the transmitter antenna array and the receiver antenna array. QR factorization of this channel matrix typically results in a unitary orthogonal matrix, Q, and an upper right triangle or triangular matrix, R, such that the channel matrix can be defined according to the equation:

$$H = Q*R \qquad (3)$$

In many of the existing sub-optimal MIMO detection techniques, QR factorization becomes very complex because, in high bandwidth mobile systems, such as WiMAX, the rate of change of the channel matrix, H, is about the same as the rate of change of the received signal $y_1$. Additionally, factorization of such equations typically involves square root operators that ire complex and time consuming to process. The LSD method and certain embodiments of the method described in the '813 application each process such square root operators for QR factorizing the H matrix in their MIMO detection processes, thus, requiring higher computational complexity.

In the process described with respect to enhanced MIMO detector 202, instead of performing the typical QR factorization, enhanced MIMO detector 202 performs a scaled Givens rotation on the channel matrix, H, which produces the upper triangular matrix, R. Givens rotations are generally used in numerical linear algebra to introduce zeros in vectors or matrices. However, standard Givens rotations still process square root and division operators. In contrast, a scaled Givens rotation also zeros elements in a vector or matrix, but does so without requiring square root and division operators. Therefore, applying the scaled Givens rotation operator (SG) to the channel matrix, H, will generate the upper triangle matrix, SR, without the computational complexity of a standard Givens rotation or standard QR factorization process. Moreover, mixing/multiplying H by SG produces a real number in the resulting upper triangular matrix, SR. This may be shown according to the following formula beginning with the basic equation for the received signal, $y_i$:

$$\begin{pmatrix} y_1 \\ y_2 \end{pmatrix} = \begin{pmatrix} h_{11} & h_{12} \\ h_{21} & h_{22} \end{pmatrix} \begin{pmatrix} x_1 \\ x_2 \end{pmatrix} + \begin{pmatrix} n_1 \\ n_2 \end{pmatrix} \qquad (4)$$

Consider that:

$$SG = \begin{pmatrix} \overline{h_{11}} & \overline{h_{21}} \\ -h_{21} & h_{11} \end{pmatrix} \qquad (5)$$

Multiplying each side by the scaled Givens rotation operator, SG, produces:

$$SG\begin{pmatrix} y_1 \\ y_2 \end{pmatrix} = SG\begin{pmatrix} h_{11} & h_{12} \\ h_{21} & h_{22} \end{pmatrix}\begin{pmatrix} x_1 \\ x_2 \end{pmatrix} + SG\begin{pmatrix} n_1 \\ n_2 \end{pmatrix} \qquad (6)$$

Considering further that:

$$Y_i = SG * y_i; \text{ and} \qquad (7)$$

$$SR = SG * H \qquad (8)$$

Let $$\begin{pmatrix} SR_{12} \\ SR_{22} \end{pmatrix} = SG\begin{pmatrix} h_{12} \\ h_{22} \end{pmatrix} \qquad (9)$$

and $$SR_{11} = |h_{11}|^2 + |h_{21}|^2 \qquad (10)$$

Rewriting equation (6) using the relationships established in equations (7), (9), and (10) results in:

$$\begin{pmatrix} Y_1 \\ Y_2 \end{pmatrix} = \begin{pmatrix} SR_{11} & SR_{12} \\ 0 & SR_{22} \end{pmatrix}\begin{pmatrix} x_1 \\ x_2 \end{pmatrix} + SG\begin{pmatrix} n_1 \\ n_2 \end{pmatrix} \qquad (11)$$

As noted above, $SR_{11}$ is a real number, which makes scaling of the results much more simple and efficient, as shown in equation (17).

For any information bit, $b_i$, a determination is made of the distance between the received signals from all receiver antenna ($y_1, y_2, \ldots y_n$) and the transmitted modulated symbols from all transmit antenna ($x_1, x_2, \ldots x_n$). This "determination" is generally found using a distance measurement of some sort, such as the Euclidean distance (ED), Manhattan distance (MD), Chebychev distance (CD), MD-CD, or the like. This distance measurement is calculated to find or estimate the distance, or the amount of error or noise, between the received signals, $y_i$ and the transmitted modulated symbol, $x_i$, which itself is estimated using the constellation points, $s_i$, for the particular modulation scheme. After determining ED, $ED^2$ is used in the probability calculation of finding the right point, such that finding a minimal ED is equivalent to finding X with a maximum likelihood.

It should be noted that ED is likely the most common distance measurement calculation used in MIMO detection. However, while ED determination typically results in more accurate results, it should be noted that the various embodiments of the teachings presented herein are not limited to only using ED. Additional and/or alternative embodiments may determine distance through measurement/calculation of MD, CD, MD-CD, or the like.

Unlike the MLLR detection method, which calculates the ED directly for all of the symbol combinations at a great cost to computational complexity, the process employed by enhanced MIMO detector 202 divides the distance calculation into two separate groups of antenna(s) and uses a partial ED calculation with a last cross constellation set (LCCS) lookup for one of the partial groups. Splitting the ED subset lookup allows the process to be more easily scaled to greater numbers of antenna. Moreover, by dividing the antenna groups into a first group with one antenna transmitting having a modulation constellation that has a generally square shape, and the second group with the remaining antenna, beneficial calculations can be leveraged from techniques only previously possible in single input, single output (SISO) systems.

In order to solve directly for the ED in the MLLR detection method, the following equation is solved for each of the desired constellation point combinations desired:

$$ED = \left\| \begin{pmatrix} y_1 \\ y_2 \end{pmatrix} - \begin{pmatrix} h_{11} & h_{12} \\ h_{21} & h_{22} \end{pmatrix}\begin{pmatrix} x_1 \\ x_2 \end{pmatrix} \right\|^2 = \left\| \begin{pmatrix} n_1 \\ n_2 \end{pmatrix} \right\|^2 \qquad (12)$$

In a 2×2 16-QAM communication link, each constellation has 16 constellation points, which requires this equation to be solved 256 times (i.e., 16×16). In a 64-QAM 2×2 link with 64 constellation points, equation (12) will be solved 4,096 times by the MLLR method (i.e., 64×64). However, when the ED calculation is split into two groups of antenna, in which at least one of the antenna produces a modulated constellation set that is generally square in nature, such as in QAM modulation, computational savings may be employed in calculating the partial EDs using a SISO subset lookup technique.

In operation, a single antenna is selected for the first group, $C_{-last}$. It is often beneficial to select the antenna having the highest modulation order. The antenna with the highest modulation order, $a_{-last}$, will usually have the most constellation points, and, thus, in MIMO detection methods such as MLLR, the largest number of point combinations to consider. $A_{-last}$ will also use a modulation scheme that has a generally square constellation set, such as the constellation set in QAM. All of the other antenna whether they are transmitting in QAM. QPSK, or the like, are placed into the group $C_{-rest}$. In a 2×2 configuration, $C_{-rest}$ would only consist of one antenna, but for additional configurations, having more than two antenna, $C_{-rest}$ will include all of the antenna other than $a_{-last}$.

Turning back to FIG. 3, SGR QR factorization module 300 produces an upper triangular matrix, SR by multiplying the scaled Givens rotation operator, SG, by the channel matrix, H. It also produces orthogonal matrix, $Q^{-1}$, the inverse of quadrature matrix, Q, typically produced during QR factorization. Considering the relationship between H, Q, SR, and SG defined in equations (3) and (8), $Q^{-1}$ is, in fact, equal to SG, the scaled Givens rotation operator. Therefore, received signal $y_i$ is mixed at multiplier 301 with SG, i.e., the orthogonal, $Q^{-1}$, matrix from SGR QR factorization module 300. This multiplication follows the equation (7) relationship to yield $Y_i$. Based on these relationships, the received signals are represented by equation (11), reproduced here as follows:

$$\begin{pmatrix} Y_1 \\ Y_2 \end{pmatrix} = \begin{pmatrix} SR_{11} & SR_{12} \\ 0 & SR_{22} \end{pmatrix} \begin{pmatrix} x_1 \\ x_2 \end{pmatrix} + SG \begin{pmatrix} n_1 \\ n_1 \end{pmatrix} \quad (11)$$

In order to begin determining the partial EDs, the second row of equation (11) is rewritten as:

$$Y_2 - SR_{22}x_2 = SG_{21}{}^*n_1 + SG_{22}{}^*n_2 \quad (13)$$

Taking the absolute square values of each side of equation (13) and letting the right-hand side of the result to be the first partial ED, ($PED_2$), $PED_2$ will be calculated according to the equation:

$$PED_2 = |Y_2 - SR_{22}x_2|^2 \quad (14)$$

As equation (14) indicates, $PED_2$ is dependent only on $x_2$.

Continuing to calculate the second partial ED ($PED_1$), the first row of equation (11) is similarly rewritten as:

$$Y_1 - SR_{11}x_1 - SR_{12}X_2 = SG_{11}{}^*n_1 + SG_{12}{}^*n_2 \quad (15)$$

Again, taking the absolute square values of each side of equation (15) and letting the right-hand side of the equation be $PED_1$, $PED_1$ is calculated according to the equation:

$$PED_1 = |(Y_1 - SR_{12}x_2) - SR_{11}x_1|^2 \quad (16)$$

Where $x_2$ is the constellation point within the constellation diagram for $C_{-rest}$. As indicated in equation (16), $PED_1$ is dependent on both $x_1$ and $x_2$; however, in order to find all $PED_1$ with respect to a fixed $x_2 = s_2$, $PED_1$ is dependent only on $x_1$. The combined distance, ED, is then equal to the sum of $PED_2$ and $PED_1$ divided by $SR_{11}$:

$$ED = (PED_1 + PED_2)/SR_{11} \quad (17)$$

The sum of $PED_1$ and $PED_2$ are divided by $SR_{11}$ because the $Q^{-1}$ matrix produced at SGR QR factorization 300 is orthogonal but not unitary. However, in practice, when the following receiver stage, such as a FEC stage, is linear and $SR_{11}$ is unchanged or, at least, similar over the FEC code block, the division by $SR_{11}$ may be omitted.

When computing the optimal results of the ED, each of the point combinations in the constellations of $C_{-rest}$ will be used to calculate the partial distance $PED_2$ independently from the points in $C_{-last}$, as provided in formula (14). However, when calculating $PED_1$, it is unnecessary to go through all of the constellation points of $C_{-last}$ because of its generally square geometry. By virtue of this square geometry, going through a defined arrangement of constellation points configured around a conditional minimal distance center point guarantees that the LCCS process will find the two minimal distance calculations necessary to satisfy equation (2). With two guaranteed minimal ED measurements, an optimal maximum LLR (M-LLR) result may be derived.

It should be noted that a similar process, referred to as the cross constellation set (CCS) lookup, has been used before in SISO systems. However, because of the multiple antenna in MIMO systems, it has not been practically applied to MIMO systems until the present teachings. Because the split ED calculations provide for the $C_{-last}$ group to consider only constellations in one single antenna conditioned to each constellation point in the c-rest group, the SISO technique can be leveraged into a MIMO application.

Figure 4A:
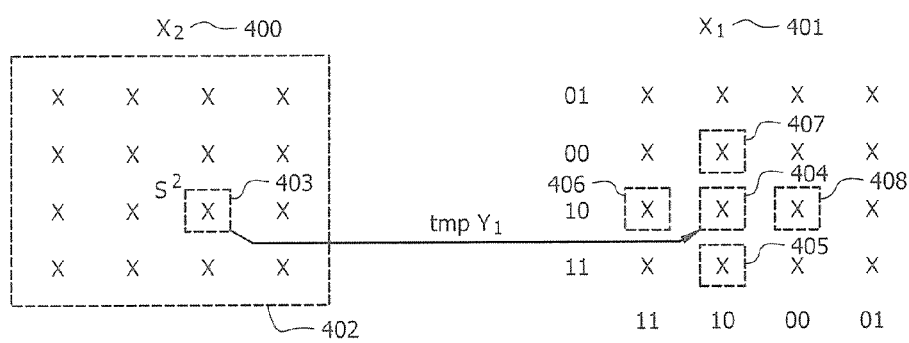
FIG. 4A is a diagram illustrating 16-QAM constellation diagrams used in an LCCS process during MIMO detection configured according to one embodiment of the present teachings.
Figure 4B:
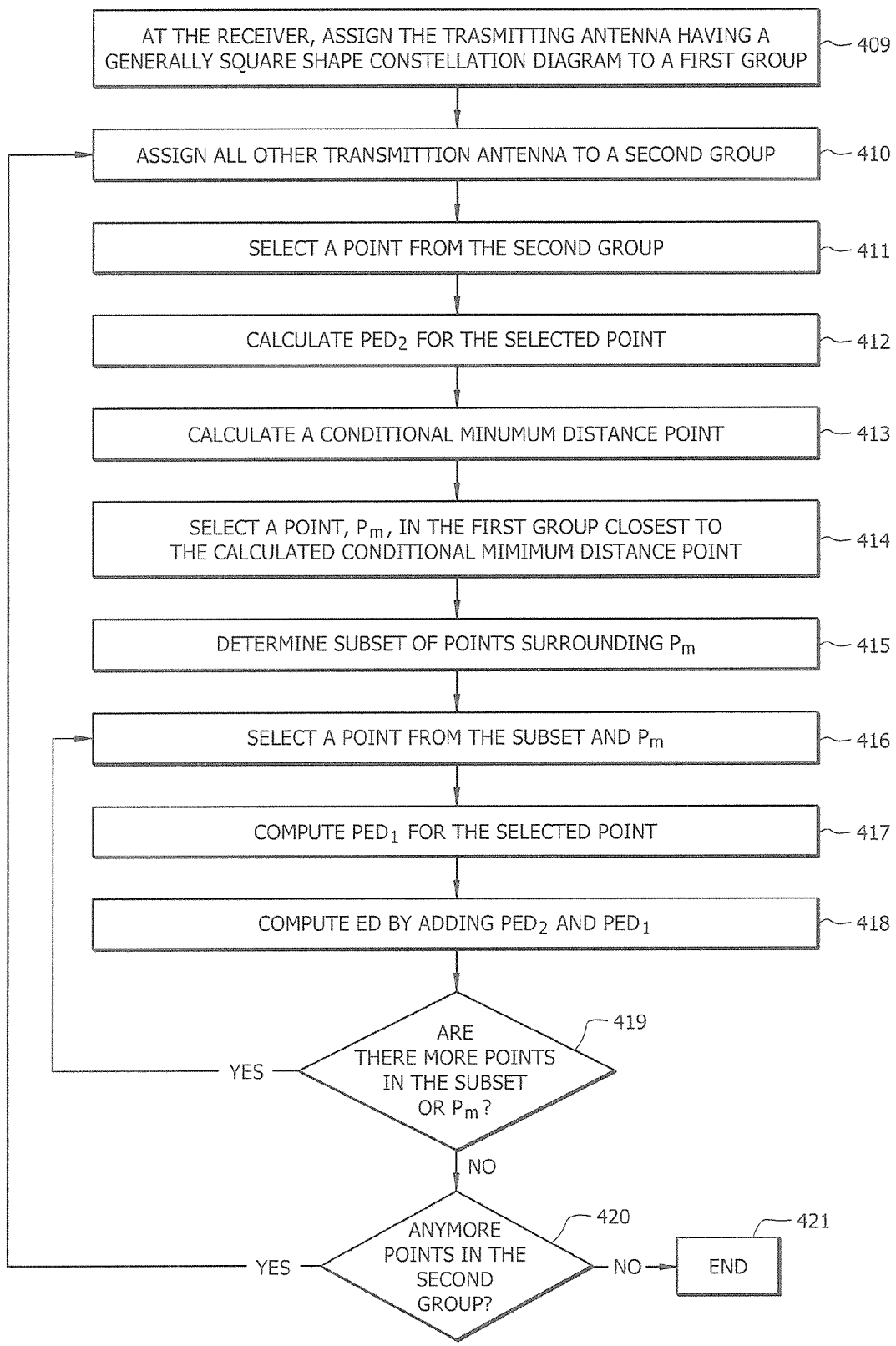
FIG. 4B is a flowchart illustrating example steps executed to implement the MIMO detection process related to constellation diagrams illustrated in FIG. 4A.

FIG. 4A is a diagram illustrating 16-QAM constellation diagrams 400 and 402 used in a 16-QAM×16-QAM MIMO detection process implemented according to one embodiment of the present teachings. FIG. 4B is a flowchart illustrating example steps executed to implement the MIMO detection process related to constellation diagrams 400 and 401 in FIG. 4A. In step 409, the receiver assigns the transmitting antenna having a generally square shape constellation diagram, $a_{t1}$, to a first group, $C_{-last}$. The remainder of the transmitting antenna, $a_{t2}$, are assigned by the receiver to a second group, $C_{-rest}$, in step 410. Constellation diagram 400 represents the constellation of $a_{t2}$, while constellation diagram 401 represents the constellation of $a_{t1}$. A constellation point, $s_2$, is selected from constellation diagram 400 in step 411. $PED_2$ ($s_2$) is computed, in step 412, according to equation (14). In step 413, a conditional minimal distance point, $tmpY_1$, is computed, according to the equation:

$$tmpY_1 = (Y_1 - SR_{12}x_2) \quad (18)$$

In step 414, a point, $P_m$ 404, is selected in constellation diagram 401 that is closest to $tmpY_1$. Once $P_m$ 404 is selected, a subset of points of interest, $P_{nm}(b_{1i})$, in constellation diagram 401 is then determined, in step 415, by looking up the subset in a look up table. Because there are a finite number of constellation points in constellation diagram 401, and because constellation diagram 401 is a generally square shape, a look up table of points of interest can be generated in advance, which further increases the speed and efficiency with which the MIMO detection process may occur.

A point is selected from the subset of points and $P_m$ 404, in step 416. In step 417, $PED_1(x_1|x_2)$ is computed according to the equation:

$$PED_1(x_1|x_2) = |tmpY_1 - SR_{11}x_1|^2 \quad (19)$$

As noted above with respect to equation (16), for any fixed $x_2$, the $PED_1$ calculation is only dependent on $x_1$. Therefore, for a fixed $x_2$, the corresponding $PED_1$ computation may use the same $tmpY_1$, which helps to simply the $PED_1$ calculations. Moreover, as also noted above, the value $SR_{11}$ is a real number, which also helps to simplify the $PED_1$ calculations. After calculating $PED_1$, the whole ED is computed, in step 418, by summing the results of $PED_2$ and $PED_1$ according to equation (17), either with or without dividing the sum by $SR_{11}$ depending on the linearity of the next stages and the rate of change of $SR_{11}$. A determination is made, in step 419, whether there are any additional points left to select in the subset of points or $P_m$. If there are points left, the process repeats from step 416. If no points are left, then a determination is made, in step 420, whether there are any more points to consider in the second group. If so, then the process repeats again from step 411. Otherwise, the procedure ends at 421. The minimal ED distances are then computed for $b_i = 1$ and $b_i = 0$ in order to optimally calculate the soft bit output.

It should be noted that the look up table of points of interest can be generated in advance by various methods in advance of the use of mobile communication systems configured according to particular embodiments of the present teachings. For example, considering the element numbers in FIG. 4A, the points of constellation diagram 401 would be searched for each bit, $b_{1i}$, of $P_m$ 404, such that the bit, $b_{1i}$, of a point, $P_{nm}(b_{1i})$, is not equal to the corresponding bit in $P_m$ 404. For example, the bits of $P_m$ 404 are $b_{13}, b_{12}, b_{11}, b_{10}=1010$. Therefore, at least one of the bits, $b_{1i}$ of the points, $P_{nm}(b_{1i})$ will not match those of $P_m$ (e.g., at least one bit $b_{1i}$ of $P_{nm}(b_{1i})$ will be $b_{13}=0, b_{12}=1, b_{11}=0,$ and $b_{10}=1$. As shown in FIG. 4A, the bit pattern of conditional minimal distance point, $P_m$ 404, is 1010. Thus, the four additional constellation points that would be pre-selected for the look up table will have a single negated bit with respect to the bit pattern, 1010, and be closest to the point $P_m$. This relationship between bit pattern of $P_m$ 404 and the additional m points of interests is presented below in the following Table 1.

TABLE 1

| Actual Bit Pattern of Constellation Point Closest to $P_m$ | Negated Bit Pattern (x = Don't Cares) |
|---|---|
| 1110 (406) | x1xx |
| 1000 (407) | xx0x |
| 1011 (405) | xxx1 |
| 0010 (408) | 0xxx |

In order to be selected as one of the additional constellation points, $P_{nm}$, in the look up table, the points that meet the criteria established above are further searched for those points at the minimal distance between $SR_{11}P_{nm}$ and $tmpY_1$. The particular selection of the additional constellation points at the minimal distance depends on the modulation order of antenna, $a_{-last}$. Most wireless network modulation rates are typically given as a power of two, e.g., 4-QAM, 16-QAM, 64-QAM, 8-QPSK, and the like. The modulation order, m, is equal to the exponent of the modulation rate: $2^m$-modulation type. For example, the modulation order of the 16-QAM system illustrated in FIG. 4A is four, as $2^4=16$. Therefore, the number of additional constellation points, $P_{nm}$, (where the 'm' of $P_{nm}$ is not the same as the modulation order 'm') that will be selected for constellation diagram 401 is four.

In the case of generating the look up table for constellation diagram 401 of FIG. 4A, two (m/2) constellation points, points 406 and 408, will be selected along the same row as the minimal distance point, $P_m$ 404. Another two (m/2) constellation points, points 405 and 407, will also be selected, in step 424, along the same column as $P_m$ 404. These constellation points 405-408 are then saved in the look up table indexed by conditional minimal distance point, $P_m$ 404. The selection process of these m additional constellation points for the $P_m$ 404 look up table will guarantee that both minimal distance values for the calculation of LLR(bi) equation (19) will be contained within two of the combinations computed with those four constellation points 405-408 plus the conditional minimal distance constellation point, $P_m$ 404. The same process is then repeated for each point in constellation diagram 401 to complete the look up table. Therefore, no matter which point in constellation diagram 401 is determined as the conditional minimal distance constellation point $P_m$, there will be the appropriate m additional points that guarantee both minimal distance values are obtained.

Referring again to FIG. 4B, once the five points in constellation diagram 401 have been selected, the $PED_1$ computations are made, as in step 417 of FIG. 4B. $PED_1$ computations are made for each of the point combinations of $s_2$ 403 and conditional minimal distance point $P_m$ 404 $s_2$ 403 and constellation point 405, $s_2$ and constellation point 406, $s_2$ 404 and constellation point 407, and $s_2$ 404 and constellation point 408. The next point in constellation diagram 400 is selected and $PED_1$ computations are again made between that next point and each of points 404-408 in constellation diagram 401. This process continues until $PED_1$ computations are made between each point in constellation diagram 400 and each of constellation points 404-408 in constellation diagram 401. Therefore, in total, the presently described example embodiment examines only 80 constellation pairs in calculating $PED_1$ compared to the examination of 256 constellation pairs for a MLLR process in a similar 16-QAM 2×2 application, both processes to find the same four soft bit outputs.

The SISO CCS process has not been used in MIMO applications because, when comparing ED corresponding to the different constellation point combinations, all of the antenna with their associated constellation diagrams conceivably need to be considered. The SISO cross lookup case in CCS involves only one antenna. Therefore, it would not generally be apparent to apply it to a MIMO case. However, because of the way in which the ED computation is split into two groups in which one of the groups now computationally has only one antenna, as long as that one antenna of the group uses a modulation scheme that provides a generally square constellation diagram (e.g., QAM), the LCCS lookup process may now be applied to MIMO applications.

After completing the LCCS process, enhanced MIMO detector 202 (FIG. 2) performs minimum ED value lookups for each bit instance, $b_i$. These minimum ED values are used to determine the LLR of the bit instances, $b_i$, according to the following formula:

$$LLR(b_i)=\min(ED(b_i=1))-\min(ED(b_i=0)) \quad (20)$$

As formula (20) suggests, two separate minimum ED values are used for determining an optimal LLR: the minimum ED when $b_i=1$, and the minimum ED when $b_i=0$. Without both of these minimum ED values, only sub-optimal LLR results can be determined, which leads to higher error ratios and lower reliability. Unlike the process employed by enhanced MIMO detector 202 (FIG. 2), the LSD MIMO detection procedure finds only a single guaranteed minimum ED value. In LSD, either one of the minimum ED for $b_i=0$ or $b_i=1$ will be missing. This missing minimum value would then be estimated based on the one optimal result. Thus, the LSD process produces sub-optimal LLR results.

The MIMO detection process described in the '813 application also produces a sub-optimal result because it computes only one of the distance values and then uses that value to estimate the second distance value. The described process selects a set of possible symbol values from a constellation diagram, similar to the LSD method, by selecting those points within a certain radius. For each of those selected symbols, a second symbol value is estimated using the values of the first possible symbols. An ED is then generated by calculating the distance between the received signal and a virtual received signal that is defined by the selected value and estimated value of the first and second symbols, respectively. The minimum ED is then selected based on that ED after which the hard output first and second symbols are selected by decoding the first and second symbols as a function of that minimum ED.

In operation, this described process subtracts the contribution of the first selected symbol from the received signal and expresses that resulting signal in terms of the second symbol. An intermediate signal is then computed based on this signal expression in terms of the second symbol. The intermediate signal is then processed by a threshold detector, symbol detector, threshold comparator, or the like. The solution or detection provided by this threshold detector is the estimated value of the second symbol which is then used in calculating the ED. Thus, the ultimate result produced by this described process is sub-optimal.

While the feature and benefits of the teachings provided herein have been disclosed with regard to a 2×2 MIMO implementation in FIGS. 3 and 4, the concepts of the present teachings apply to additional MIMO implementations as well.

Figure 5:
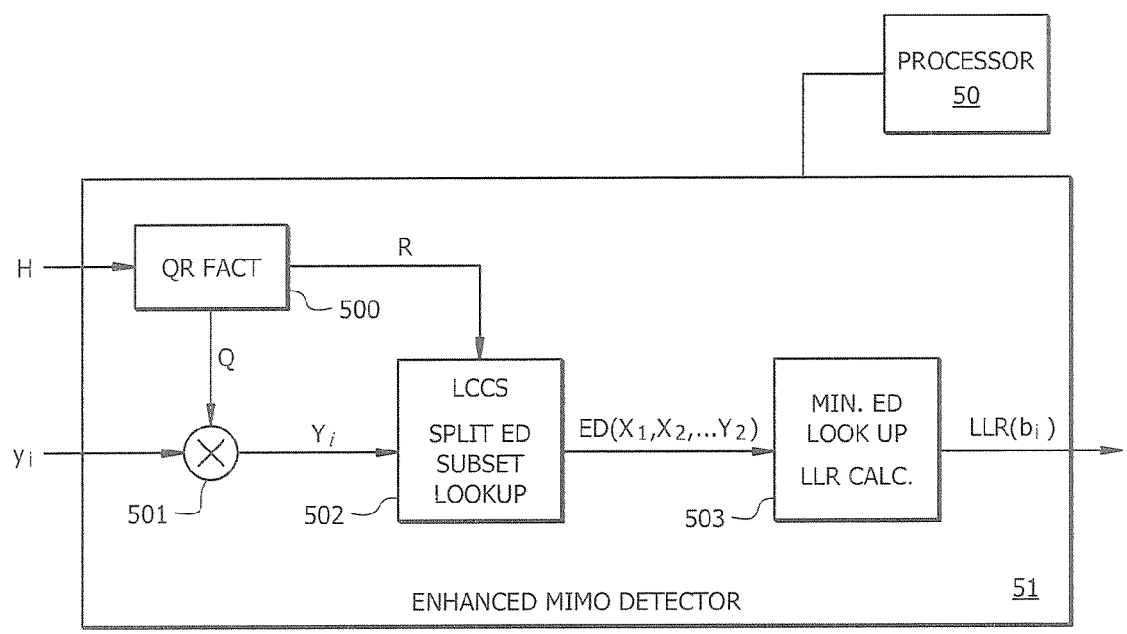
FIG. 5 is a block diagram illustrating a detail of an enhanced MIMO detector configured according to one embodiment of the present teachings.

FIG. 5 is a block diagram illustrating a detail of enhanced MIMO detector 51 configured according to one embodiment of the present teachings. Enhanced MIMO detector 51 operates in a similar fashion to enhanced MIMO detector 202 (FIG. 2-4) except that it operates on more than two antenna. For purposes of this example implementation, enhanced MIMO detector 51 operates, under control of processor 50, in a three-antenna application. Enhanced MIMO detector 51 receives the received signal, $y_i$, from the antenna array of its receiver. The channel matrix, H, is QR factorized into the quadrature, Q, matrix and the upper triangular, R, matrix at modulator 500. The Q matrix is mixed with the received signal, $y_i$, to form $Y_i$. The factorized channel matrix is then combined with received vector signal, $Y_i$, at unit 502, where ED calculations are made. The ED calculations are split into two groups, as in the 2×2 application. The first group contains the generally square-shaped constellation set for a first transmitting antenna, while the second group contains the constellation sets for all of the other transmitting antenna regardless of their constellation shapes. $PED_2$ and $PED_1$ are calculated as in the 2×2 application with the $LCCS_1$ lookup procedure being used to find the appropriate ED values that can be used to guarantee finding two optimal minimum ED measurements for the LLR computation. As with the 2×2 application, the LCCS in the present 3×3 application also requires the use of no more than the fixed number of constellation points lying in a cross around the constellation point with the smallest PED. Finally, at unit 503, the minimum ED lookups are performed for the calculation of the soft-bit results, $LLR(b_i)$.

The difference between the operation of enhanced MIMO detector 51 (FIG. 5) and enhanced MIMO detector 202 (FIGS. 2 & 3) lies in the QR factorization. Because of the increased number of antenna, enhanced MIMO detector 51 cannot simplify the QR factorization by performing the scaled Givens rotation sequence. Instead, the QR factorization may be performed by any number of known methods including those using square root operators, which increases the computational complexity over that in the special 2×2 MIMO application. However, even with this increased computational complexity, the overall computations are less complex than the processes found in MLLR, LSD, and the '813 application, and the process is still able to provide two guaranteed minimum EDs, which, in turn, provide optimal soft-bit results. Neither LSD nor the process in the '813 application provide such optimal results.

It should be noted that processor 30 (FIG. 3) and processor 50 (FIG. 5) may be configured as digital signal processors (DSPs), field programmable gate arrays (FPGAs), microprocessors, microcontrollers, or the like.

Figure 6:
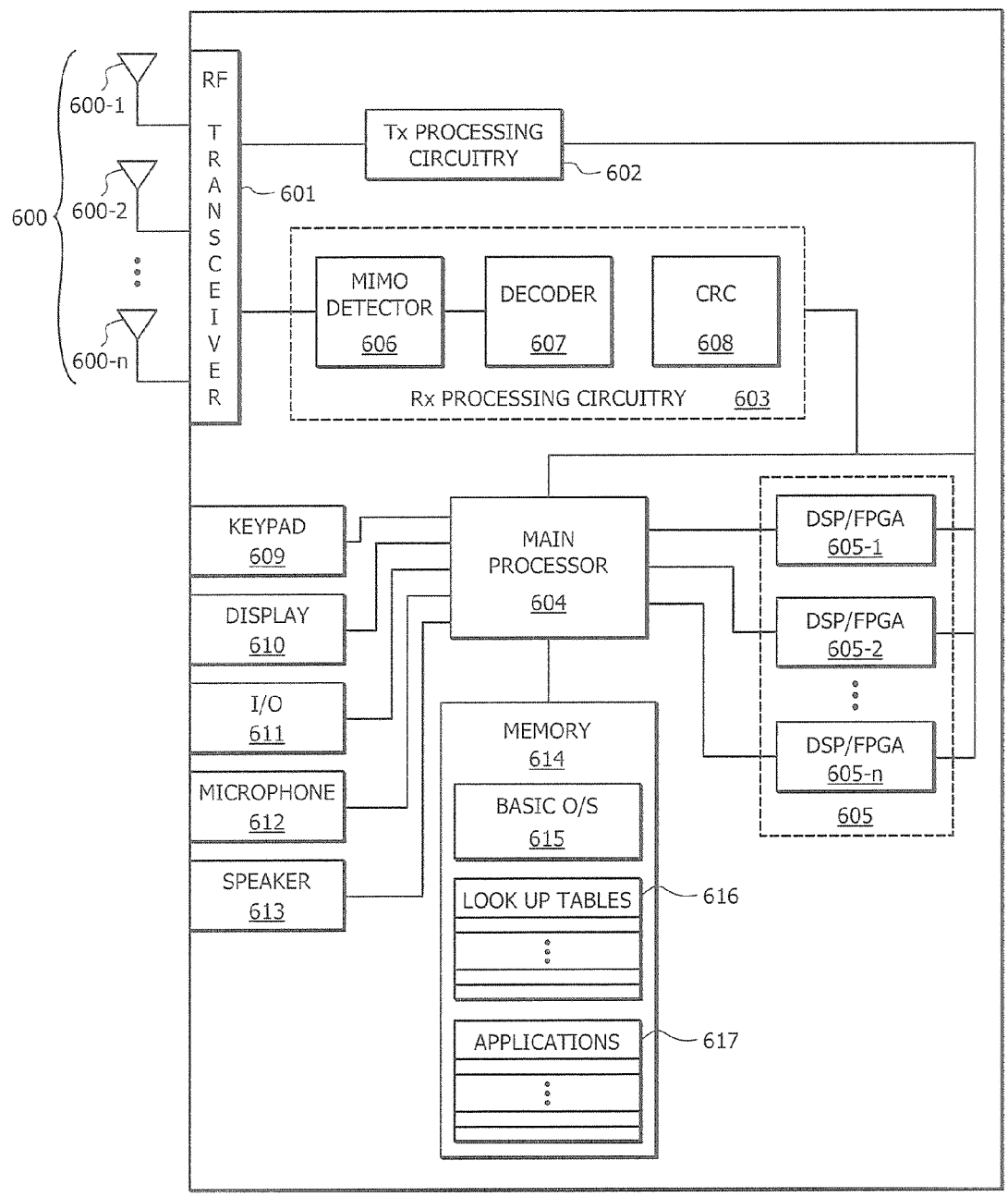
FIG. 6 is a block diagram illustrating a mobile device configured to operate according to one embodiment of the present teachings.

FIG. 6 is a block diagram illustrating mobile device 60 configured according to one embodiment of the present teachings. Mobile device 60 is a MIMO device having antenna array 600 consisting of antenna 601-1-601-$n$. Antenna array 600 provides the transmission/reception mechanism for radio frequency (RF) transceiver 601. Signals received through antenna array 600 are processed through receiver processing circuitry 603. Various embodiments of the present teachings, which provide enhanced MIMO detection, are included in receiver processing circuitry 603. For example, receiver processing circuitry 603 includes MIMO detector 606, such as those MIMO detectors described in FIGS. 2, 3, and 5, decoder 607, and CRC unit 608. The different functional stages provided by receiver processing circuitry 603 operate in conjunction with DSP/FPGA 605, which may comprise one or more individual DSP/FPGAs 605-1-605-N either as separate processors or integrated into a single chip DSP/FPGA having multiple processing cores, and main processor 604.

Main processor 604 also controls and manages operation between user interface features of mobile device 60, such as keypad 609, display 610, microphone 612, and speaker 613, and the other functionality of mobile device 60. The operation of mobile device 60 through main processor 604 is driven in conjunction with the applications and information stored on memory 614. Memory 614 stores such items as basic operating system (O/S) 615, lookup tables 616, and applications 617. Any one or more of the lookup tables in lookup tables 616 or the applications under application 617 may supplement or define the operation of the receiver processing circuitry 603, through execution controlled by main processor 604 and/or DSP/FPGA 605.

Main processor 604 and DSP/FPGA 605 also operate to process input information from any of the user input devices, such as keypad 609, display 610, and microphone 612, or from the internal system input/output (I/O) 611, which provides results to local processing defined by applications 617 running on mobile device 60. This processed input may then be passed to transmitter processing circuitry 602 to prepare outgoing data and information for transmission through RF transceiver 601 and antenna array 600.

It shall be appreciated that the present disclosure is not limited to the architecture of mobile device 60. Any combination of hardware and software that can execute to perform the functionality described with regard to the enhanced MIMO detection may be used for implementing embodiments of the present teachings.

Figure 7:
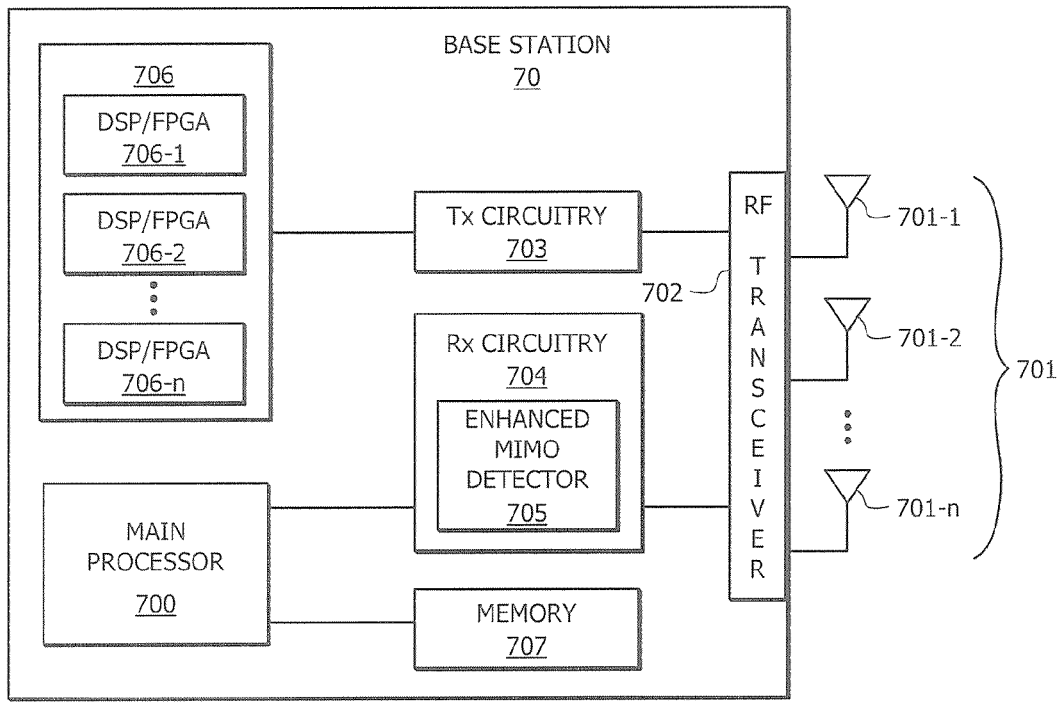
FIG. 7 is a block diagram illustrating a base station configured according to one embodiment of the present teachings.

FIG. 7 is a block diagram illustrating base station 70 configured according to one embodiment of the present teachings. Just as a mobile terminal, such as mobile device 60 (FIG. 6), may be configured with enhanced MIMO detection as described by the teachings herein, base stations may also be configured with enhanced MIMO detection. Base station 70 includes main processor 700 that controls the operation and processing of its computer-driven functions. Antenna array 700, with antenna 701-1-701-$n$, transmit and receive the signals making up the communications network that base station 70 is a part of. RF transceiver 702 operates to send and receive the signals to and from antenna array 700. Signals to be transmitted are processed by or under control of main processor 700 and one or more of DSP/FPGA cores 706-1-706-$n$ of DSP/FPGA component 706 and passed through transmission circuitry 703 prior to being prepared for antenna array 701 by RF transceiver 702. These transmission signals are processed using hardware, firmware, and software functionality stored in memory 707.

Signals that are received by RF transceiver 702 from antenna array 701 are processed by receiver circuitry 704 which includes enhanced MIMO detector 705. Enhanced MIMO detector 705 operates consistently with the methods and operations described with respect to the examples in FIGS. 3 and 5. The detected and decoded signals may then be further processed by or under control of main processor 700 and one or more of DSP/FPGA cores 706-1-706-$n$ also using hardware, firmware, and/or software functionality stored in memory 707. After such processing, the signals may be further prepared for transmission from base station 70 through transmission circuitry 703, RF transceiver 702, and antenna array 701. However, as noted above, the operation of enhanced MIMO detector 705 remains consistent with the various embodiments described herein.

Figure 8:
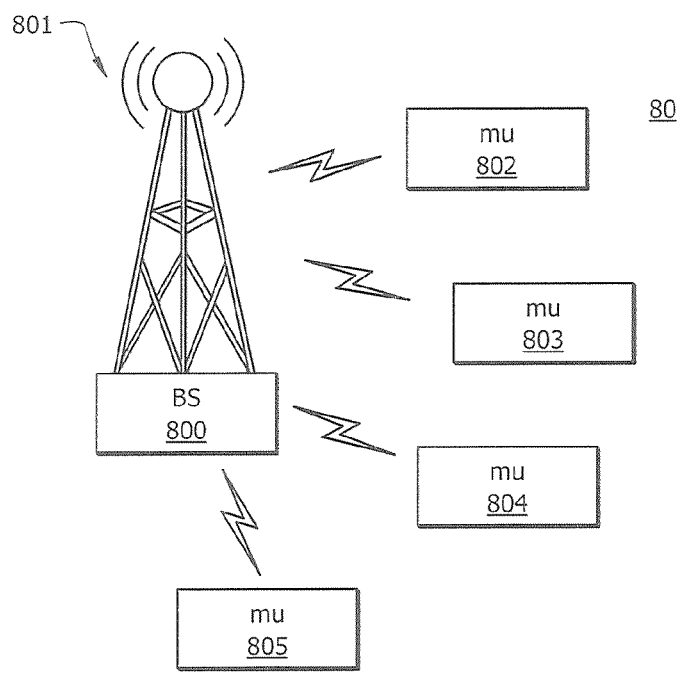
FIG. 8 is a block diagram illustrating a MIMO OFDMA wireless network configured according to one embodiment of the present teachings.

FIG. 8 is a block diagram illustrating MIMO OFDMA wireless network 80 configured according to one embodiment of the present teachings. FIG. 8 illustrates a single base station base station 800, of the multiple base stations (not shown), that make up MIMO OFDMA wireless network 80. Base station 800 transmits and receives the spatially multiplexed MIMO signals through antenna array 801 to and from mobile units, MU 802-805. Base station 800 and MUs 802-805 each includes an enhanced MIMO detector configured to operate according to the operational descriptions provided with regard to FIGS. 3 and 5, herein. MIMO OFDMA wireless network 80 will experience efficient and reliable communication as each of the enhanced MIMO detectors will provide optimal results in the symbol detection with a minimum of computation complexity.

Figure 9:
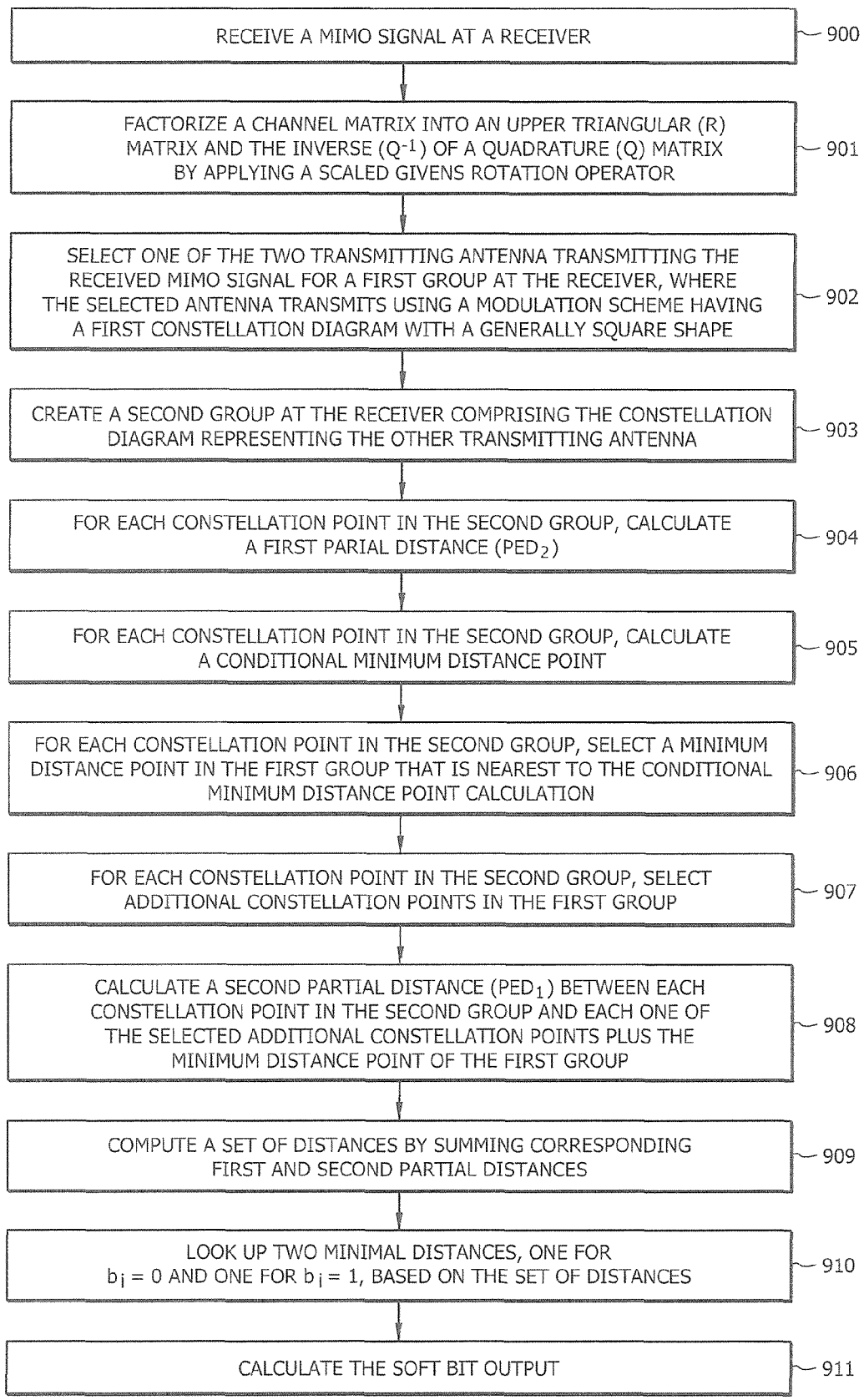
FIG. 9 is a flowchart illustrating example steps executed to implement such embodiment of the present teachings configured to operate in a 2×2 MIMO system.

FIG. 9 is a flowchart illustrating example steps executed to implement such embodiment of the present teachings configured to operate in a 2×2 MIMO system. In step 900, a MIMO signal is received at a receiver. A channel matrix is factorized, in step 901, into an upper triangular (R) matrix and an inverse ($Q^{-1}$) quadrature matrix (Q) by applying a scaled Givens rotation operator (SC). One of the two transmitting antenna transmitting the received MIMO signal is selected, in step 902, for a first group at the receiver, where the selected antenna transmits using a modulation scheme having a first constellation diagram with a generally square shape. A second group is created, in step 903, at the receiver comprising the constellation diagram representing the other transmitting antenna. For each constellation point in the second group, a first partial distance ($PED_2$) is calculated, in step 904, according to equation (14). Again, for each constellation point in the second group, a conditional minimum distance point is calculated, in step 905, according to equation (18). In step 906, a minimum distance point is selected in the first group that is nearest to the conditional minimum distance point calculation. Additional constellation points in the first group are selected, in step 907, using a look up table based on the selected minimum distance point. A second partial distance ($PED_1$) is calculated, in step 908, between each constellation point in the second group and each one of the selected additional constellation points plus the minimum distance point. A set of distances is computed based on a sum of corresponding ones of each of the first and second partial distances, in step 909. In step 910, two minimal distances, one for $b_i=0$ and one for $b_i=1$, are looked up based on the set of distances. In step 911, the soft bit output is calculated according to equation (19).

Although the present teachings and their advantages have been described in detail, it should be understood that various changes, substitutions and alterations can be made herein without departing from the spirit and scope of the teachings as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present teachings, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

What is claimed is:

1. A method for detecting multiple input multiple output (MIMO) communications, the method comprising:
responsive to receiving a MIMO signal at a receiver, selecting for a first group one antenna from a plurality of antenna transmitting said received MIMO signal, wherein said selected one antenna transmits using a modulation scheme represented by a first constellation diagram having a generally square shape;
designating a second group comprising one or more additional constellation diagrams representing remaining ones of said plurality of antenna;
estimating a set of distances between said received MIMO signal and a corresponding transmitted symbol, wherein said estimating comprises, for each constellation point in said second group:
calculating a first partial distance between said each constellation point in said second group and said received MIMO signal; and
calculating a second partial distance between said each constellation point in said second group and each one of a select group of constellation points in said first group, wherein said select group of constellation points comprises a minimal distance constellation point and m additional constellation points arranged in a cross surrounding said minimal distance point in said constellation diagram, wherein m is a modulation order of said modulation scheme;
computing said set of distances based on a sum of corresponding ones of each of said first and second partial distances; and
looking up two minimal distances based on said set of distances.

2. The method of claim 1 further comprising:
factorizing a channel matrix into an upper triangular (R) matrix and an inverse ($Q^{-1}$) of a quadrature matrix (Q), wherein said factorizing comprises applying a scaled Givens rotation operator to said channel matrix to create said R and $Q^{-1}$ matrices.

3. The method of claim 1 further comprising:
computing a conditional minimum distance point based on said received MIMO signal rotated by said scaled Givens rotation operator and said R matrix; and
selecting said minimal distance constellation point by selecting one of a plurality of points in said first constellation diagram closest to said computed conditional minimum distance point.

4. The method of claim 1 further comprising:
calculating an optimal soft bit result from said two minimal distances.

5. The method of claim 1 wherein said receiver is disposed in one of:
a mobile station; or
a base station.

6. The method of claim 1 wherein said m additional constellation points are selected from a look up table indexed according to said minimal distance constellation point.

7. A wireless receiver comprising:
a main processor;
memory coupled to said main processor;
receiver circuitry coupled to said main processor;
an antenna array having a plurality of antenna, said antenna array coupled to said receiver circuitry;
a multiple input, multiple output (MIMO) detector within said receiver circuitry, wherein said MIMO detector is configured to:
form a first group comprising a first constellation diagram having a generally square shape, said first constellation group representing a modulation scheme of one of said plurality of antenna:
form a second group comprising one or more additional constellation diagrams representing said modulation scheme of a remainder of said plurality of antenna;
for each constellation point in said second group, said MIMO detector is further configured to:

calculate a first partial Euclidean distance (PED$_2$) based on said each constellation point in said second group;
select a minimum distance point in said first group;
retrieve m additional points from a look up table stored in said memory, said m additional points indexed according to said minimum distance point, wherein said m additional points form a cross surrounding said minimum distance point, and wherein m is a modulation order of said one of said plurality of antenna of said first group;
compute a second partial Euclidean distance (PED$_1$) between said each constellation point in said second group and each of: said minimum distance point and said m additional points; and
sum said PED$_2$ and said PED$_1$ into a distance; and
determine soft bit output based on said distance.

8. The wireless receiver of claim 7 wherein said wireless receiver is in a 2×2 receiver-transmitter scheme, said MIMO detector further comprising:
a factorizing component configured to apply a scaled Givens rotation operator to a channel matrix representing a channel over which said received MIMO signal is received by said antenna array, wherein application of said scaled Givens rotation operator produces an upper triangular (R) matrix and an inverse quadrature ($Q^{-1}$) matrix of a quadrature matrix (Q) of said channel matrix.

9. The wireless receiver of claim 7 wherein said MIMO detector is further configured to:
compute a conditional minimum distance point based on said R matrix and said received MIMO signal rotated by said scaled Givens rotation operator; and
select said minimal distance point by selecting one of a plurality of points in said first constellation diagram closest to said computed conditional minimum distance point.

10. The wireless receiver of claim 7 wherein said MIMO detector is further configured to:
look up two minimal distances based on said distance, wherein one of said two minimal distances represents $b_i=1$ and the other of said two minimal distances represents $b_i=0$; and
calculate a least likelihood ratio (LLR) based on said two minimal distances, wherein said LLR comprises said soft bit output.

11. The wireless receiver of claim 7 wherein said MIMO detector is further configured to:
detect a modulation scheme for said plurality of antenna transmitting said received MIMO signal.

12. The wireless receiver of claim 7 wherein said wireless receiver provides receiving functionality to one of:
a mobile unit; and
a base station.

13. The wireless receiver of claim 7 further comprising:
one or more supplemental processors coupled to said main processor, wherein said main processor supplements control said MIMO detector using said one or more supplemental processors.

14. The wireless receiver of claim 13 wherein said one or more supplemental processors comprise one of:
digital signal processors (DSPs); or
field programmable gate arrays (FPGAs).

15. A method for detecting multiple input, multiple output (MIMO) signals in a 2×2 spatially multiplexed MIMO wireless network, said method comprising:
receiving a MIMO signal at a receiver;
inserting zeros into a channel matrix by factorizing said channel matrix with a scaled Givens operator;
dividing two transmitting antenna into two groups, wherein a first group includes a generally square constellation diagram representing a first transmitting antenna of said two transmitting antenna and a second group includes another constellation representing the other transmitting antenna of said two transmitting antenna;
mixing said factorized channel matrix with said received MIMO signal;
estimating a set of distances between said factorized received MIMO signal and a plurality of constellation points of said first and second groups, wherein said estimating comprises, for each constellation point in said second group:
calculating a first partial distance between said each constellation point in said second group and said factorized received MIMO signal; and
calculating a second partial distance between said each constellation point in said second group and each one of a select group of constellation points in said first group, wherein said select group of constellation points comprises a minimal distance point and m additional constellation points, wherein m is a modulation order of a modulation scheme used by said first transmitting antenna; and
computing said set of distances based on a sum of corresponding ones of each of said first and second partial distances.

16. The method of claim 15 further comprising:
computing a conditional minimum distance point based on said factorized channel matrix and said received MIMO signal rotated by said scaled Givens rotation operator; and
select said minimal distance point by selecting one of a plurality of points in said generally square constellation diagram of said first group closest to said computed conditional minimum distance point.

17. The method of claim 15 wherein said m additional constellation points are selected from a look up table using said minimum distance point.

18. The method of claim 15 further comprising:
for each constellation point in said second group, looking up two minimal distances based on said set of distances, wherein one of said two minimal distances represents $b_i=1$ and the other of said two minimal distances represents $b_i=0$.

19. The method of claim 15 further comprising:
calculating an optimal soft bit result from said two minimal distances.

20. The method of claim 15 wherein said receiver is disposed in one of:
a mobile station; or
a base station.

* * * * *

UNITED STATES PATENT AND TRADEMARK OFFICE
CERTIFICATE OF CORRECTION

PATENT NO. : 8,279,965 B2  Page 1 of 1
APPLICATION NO. : 12/495305
DATED : October 2, 2012
INVENTOR(S) : Chris Leung It is certified that error appears in the above-identified patent and that said Letters Patent is hereby corrected as shown below:

Column 2, Equation 1, Line 13, delete the portion of the equation reading "$h_{nm}$" and replace with --$h_{nn}$--.

Signed and Sealed this
Twentieth Day of November, 2012

David J. Kappos
*Director of the United States Patent and Trademark Office*